United States Patent [19]

Öberg et al.

[11] 4,009,023
[45] Feb. 22, 1977

[54] METHOD FOR THE REFINING OF MOLTEN METAL

[75] Inventors: Karl Erik Öberg; Bengt Olof Sjöberg, both of Hagfors, Sweden

[73] Assignee: Uddeholms Aktiebolag, Hagfors, Sweden

[22] Filed: Feb. 15, 1974

[21] Appl. No.: 443,160

[30] Foreign Application Priority Data

Feb. 15, 1973 United Kingdom ............... 7588/73

[52] U.S. Cl. .......................................... 75/12; 75/30; 75/51; 75/53; 75/58; 75/94; 75/95
[51] Int. Cl.² .......................................... C21C 5/52
[58] Field of Search ............... 75/11, 12, 13, 30, 51, 75/53, 58, 94, 95

[56] References Cited
UNITED STATES PATENTS

| | | | |
|---|---|---|---|
| 1,744,418 | 1/1930 | Smith | 75/53 |
| 2,593,505 | 4/1952 | Wagstaff | 75/51 |
| 3,015,554 | 1/1962 | Rummel | 75/51 |
| 3,827,877 | 8/1974 | Pantke et al. | 75/11 |

*Primary Examiner*—M. J. Andrews
*Attorney, Agent, or Firm*—Cushman, Darby & Cushman

[57] ABSTRACT

Steels, free from hard inclusions which will not deform during hot working, are obtained by introducing into a molten steel under calcium free conditions a silica based slag powder having fluxing components such as manganese oxide which gives a slag of melting point and of density not higher than that of the steel. The slag powder melts and rises through the molten steel interacting with inclusion components, most of which rise to the surface of the melt, so that when the steel solidifies any inclusions remaining are free from calcium and will deform at hot forming temperatures.

9 Claims, 1 Drawing Figure

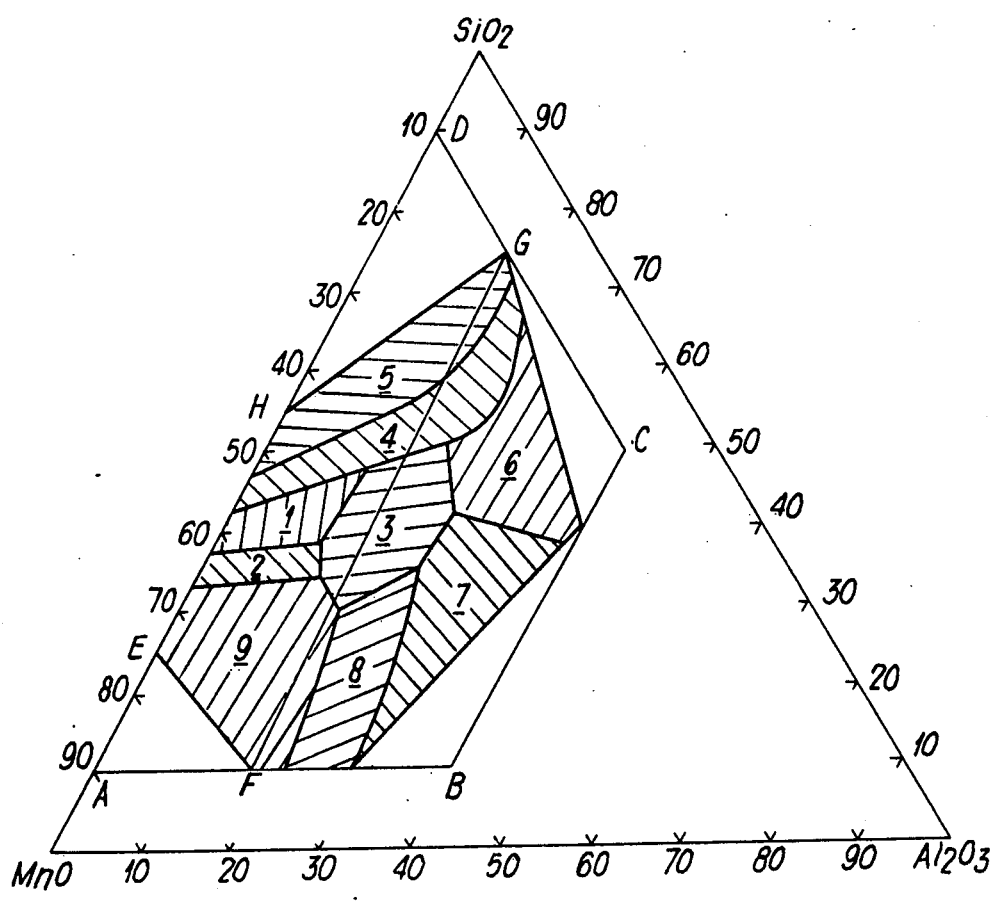

METHOD FOR THE REFINING OF MOLTEN METAL

The present invention relates to a process for refining steel and in particular, to produce a steel product, comprising after solidification, substantially only such slag inclusions as are plastically deformable at the hot-forming temperature of the steel.

Conventional steel making processes give rise to so called acid and basic steels depending mainly upon whether the steel is made in a convertor having an acidic e.g. silicicious or basic e.g. calcium or magnesium containing, lining. The acid steelmaking processes are considered traditionally to give a steel which in many respects is qualitatively superior to steel which has been made by the basic route. This is due to the fact most of the slag inclusions in the acid steels are plastically deformable at the hot-forming temperature of the steel. The disadvantage of the acid processes compared with the basic ones is that the acid silica-rich slags make the refining to remove phosphorus and sulphur difficult if not impossible, so that only raw materials which are poor in sulphur and phosphorus can be used. This reduces the economic value of the acid processes. For this reason the acid processes are used less than the basic processes, in spite of the fact that with the latter, a steel is obtained which contains hard, non-deformable slag inclusions, for example inclusions of the spinel, calcium aluminate and aluminium silicate type. The presence of these hard slags reduces such properties of the steel as fatigue strength, grindability and polishability, corrosion resistance, deep-drawing properties etc. In cases where these particular characteristics, are important, acid steels are still used. Examples of products which are normally still manufactured from acid steel are razor blades, valve spring wire, flapper valves etc.

The present invention provides a refining procedure which enables the metallurgical advantages of the basic processes to be retained whilst the disadvantages mentioned above are substantially avoided. The application of the invention is not limited, however, to refining of basic steel but may also be used in the refining of acid steel to eliminate coarse inclusions without introducing hard inclusions into the material.

BRIEF DESCRIPTION OF THE DRAWING

The drawing illustrates a phase diagram for a three component system composed of $Al_2O_3$, $SiO_2$, and $MnO$. The triangular diagram shown conveniently illustrates the phase relationships at constant temperature and pressure. A two-phase equilibrium system will be univariant and will be represented by a line on this diagram. If the three phases coexist, the system is invariant since both temperature and pressure are constant. When three phases coexist, this may be represented by a point on the diagram (the intersection of three lines) or by an area bounded by three lines. The nine areas of the diagram bounded by three lines correspond to the following phases:

| Section | Phase |
|---|---|
| 1 | Rhodonite |
| 2 | Tephroite |
| 3 | Spessartite |
| 4 | Tridymite |
| 5 | Cristobalite |
| 6 | Mullite |
| 7 | Corundum |
| 8 | Galaxite |
| 9 | Manganosite |

DETAILED DESCRIPTION OF THE INVENTION

The present invention provides a process for producing a steel substantially free from inclusions which are not plastically deformable at a hot forming temperature of the steel which comprises forming a body of molten steel in a vessel having a lining in contact with the molten steel, the lining being substantially free from calcium containing compounds and from magnesium containing compounds and introducing into the body of molten steel, below the surface thereof, a slag powder, the slag containing silica and at least one fluxing agent which will produce a slag of melting point not higher than that of the steel and of density not higher than that of the steel, the slag being substantially free from calcium and from magnesium and of a character such that it will interact with any inclusions in the molten steel bringing some of the inclusions to the surface of the molten steel and transforming other inclusions so that any inclusions which form in the steel on solidification are plastically deformable at hot forming temperatures.

The hot-forming temperature of steels is normally in the range 1000°–1100° C. The expression plastically deformable, means that the ratio between the true elongation of the inclusion and the true elongation of the steel shall not be less than one. This can be expressed by the formula:

$$\nu = \frac{\epsilon_{inclusion}}{\epsilon_{metal}} \geq 1$$

The true elongation of the inclusions $\epsilon$ may be written:

$$\epsilon_{inclusions} = \ln (b/r_o)$$

where $r_o$ is the radius in a sphere before deformation and $b$ is the major axis in the ellipsoid formed. In order to neglect extension in the third dimension, the same expression may also be written $$\epsilon_{inclusions} = \frac{1}{2} \ln (b/a)$$

where $a$ is the minor axis in the ellipsoid. The true elongation of the steel is given by the formula $$\epsilon_{metal} = \ln h_o/h_1$$

where $h_o$ is the starting height and $h_1$ is the final height at plane compression.

The invention may be used to refine any type of steel including both basic steels i.e. containing calcium and/or magnesium, or non-basic e.g. acidic steels made by the acidic open hearth process. Examples of such steels include acid carbon steel for cutting tools and instruments, springs and low-alloy tool steel and the like. The invention may also be applied, however, in the manufacture of higher alloyed steel, such as high-alloy tool steel, high-strength structural steel, ball bearing steel and stainless steel.

A silicon based slag is used in this invention and the slag also contains a fluxing component to give a slag of both melting and density not higher than that of the steel. This ensures that the slag powder melts and rises to the surface of the molten steel. The flux may be one or more selected from aluminium oxide, manganese oxide, sodium oxide, potassium oxide, iron oxide and sodium fluoride. Experiments suggest that a synthetic slag of MnO and $SiO_2$ is very suitable for the refining of low-alloyed steels. Components which can form hard oxidic inclusions, mainly CaO and MgO, should be substantially absent but may be tolerated as unavoidable impurities in amounts which do not cause hard inclusions to form. Normally the total amount of CaO and MgO should not be more than 2% w/w and preferably not more than 1% w/w. On the other hand, a comparatively high content of $Al_2O_3$ is permissible in the slag, the criterium for the maximum quantity of $Al_2O_3$ permissible being that the quantity of $Al_2O_3$ present in the slag in combination with any $Al_2O_3$ present in the molten metal prior to the injection should not be so high that it leads to the formation of hard phases in the $MnO.SiO_2.Al_2O_3$-system, but only to such phases which are plastic at the hot-forming temperature of the steel. The slag may contain such components which essentially do not interfere in the desired refining reactions. An example of such a component is FeO. Where the composition of the slag is mentioned below, the percentages are based on the total weight of the components effective in the refining processes. For example, if a slag contains $SiO_2$, MnO and $Al_2O_3$ as active components, the percentage of each component is calculated on the basis of the total weight of these three components.

As a practical matter, a synthetic slag based on $SiO_2$ and MnO with the optional presence of $Al_2O_3$ is preferred. The ideal proportions of MnO and $SiO_2$ in the slag are controlled to a high degree by the melting point of the slag. Both MnO and $SiO_2$ have high melting points but at approximately 60% MnO and 40% $SiO_2$ ($MnO:SiO_2 = 3:2$ weight ratio), a low-melting region exists which is very suitable for purposes of the present invention. If the slag does not contain components other than MnO and $SiO_2$ the low-melting region will be relatively narrow, corresponding to the composition range approximately 45 to 75% MnO and approximately 55 to 25% $SiO_2$. If, on the other hand, the composition contains components other than MnO and $SiO_2$, such as for example $Al_2O_3$, the low-melting region may be widened to approximately 10 to 19% MnO and 90 to 10% $SiO_2$ ($MnO:SiO_2 = 1:9$ to $9:1$). Particularly suitable slag compositions are comprised within the region which is defined by the points A — B—C — D — A in the accompanying drawing.

The coordinates of these points are as follows:
Point A: 90% MnO, 10% $SiO_2$, 0% $Al_2O_3$ corresponding to MnO: $SiO_2$:$Al_2O_3$ weight ratio = 9:1:0;
Point B: 50% MnO, 10% $SiO_2$, 40% $Al_2O_3$ corresponding to MnO: $SiO_2$:$Al_2O_3$ weight ratio = 5:1:4;
Point C: 10% MnO, 50% $SiO_2$, 40% $Al_2O_3$ corresponding to MnO: $SiO_2$:$Al_2O_3$ weight ratio = 1:5:4;
Point D: 10% MnO, 90% $SiO_2$, 0% $Al_2O_3$ corresponding to MnO: $SiO_2$:$Al_2O_3$ weight ratio = 1:9:0:

Preferably, however, a slag based on MnO, $SiO_2$ and $Al_2O_3$ should have a composition within the narrower region which is defined by the points E — F — G — H — E in the drawing. The coordinates of the corner points in the preferred narrower region are as follows:
Point E: 75% MnO, 25% $SiO_2$, 0% $Al_2O_3$ corresponding to MnO: $SiO_2$:$Al_2O_3$ weight ratio = 3:1:0;
Point F: 75% MnO, 10% $SiO_2$, 15% $Al_2O_3$ corresponding to MnO: $SiO_2$:$Al_2O_3$ weight ratio = 15:2:3;
Point G: 10% MnO, 75% $SiO_2$, 15% $Al_2O_3$ corresponding to MnO: $SiO_2$:$Al_2O_3$ weight ratio = 2:15:3;
Point H: 45% MnO, 55% $SiO_2$, 0% $Al_2O_3$ corresponding to MnO: $SiO_2$:$Al_2O_3$ weight ratio = 9:11:0.

Allowing for the fact that a deoxidized steel melt which will often be used in the process according to the invention, usually contains significant quantities of $Al_2O_3$, which must be taken into account in addition to the $Al_2O_3$-content of the slag, the line delimiting the shadowed sections in the diagram will correspond approximately to the 1500° C isotherm. If a slag with a composition in the region delimited by the line E—F—G—H—E is introduced into the molten steel, only slag inclusions will be obtained as are molten only at temperatures of about 1500° C and higher. The sections defined by 1 – 9 in the diagram comprises slags which primarily solidify to phases of the following types:
Rhodonite: section 1 in the drawing;
Tephroite: section 2 in the drawing;
Spessartite: section 3 in the drawing;
Tridymite: section 4 in the drawing;
Cristobalite: section 5 in the drawing;
Mullite: section 6 in the drawing;
Corundum: section 7 in the drawing;
Galaxite: section 8 in the drawing;
Manganosite: section 9 in the drawing.

The slag to be used in the present invention, is conveniently produced by melting the different slag components together followed by solidifying and then crushing. This gives a powder in which every single grain contains all the slag components, a fact which facilitates the melting and ability of the slag to function in the desired manner. It is also possible to homogenize particles of the different component of the slag mechanically so that a mixture of very fine grains having a sufficient homogeneity is obtained but this is not recommended.

In order that the reactions with the inclusions in the molten steel proceed at an adequate rate, it is important to use sufficient of the slag powder. The optimum amount will be controlled by both the extent and nature of the inclusions in the steel as well as the composition of the slag but 0.1 to 2% by weight and preferably 0.5 to 1.5% by weight, based on the weight of steel to be treated, is usually sufficient. The use of amounts of slag outside these ranges is possible however.

In practice it has been found convenient to melt the steel to be treated in an induction furnace having a non-basic refractory lining e.g. of silica and having at least one tuyere opening into the furnace nearer to the bottom than the top. The tuyere or tuyeres may open into the furnace through the bottom or at the side near to the bottom to give the maximum possible traversal of the molten steel by the rising slag. An induction heated converter fitted with appropriate tuyeres is most convenient. By a converter, we mean a tiltable processing vessel having its height substantially greater than its width so that the slag powder can be injected into the molten steel below its surface at a desired velocity without splashing occurring as it would in a ladle. However a ladle can be used if it is practical to use an injection velocity which does not cause unacceptable splashing.

When carrying out the process in a vessel fitted with a tuyere, the slag powder may be introduced through the tuyere entrained in an inert carrier gas. By inert we mean 'non oxidising' and in practice a chemically inert gas such as argon is most convenient although a reducing gas such as methane can equally be used.

The particle size of the slag powder is not critical except insofar as it is desirable to have it small enough to be entrained in the inert carrier gas and introduced into the molten steel. An average particle size below 2 mm. is usually small enough.

A typical process sequence is as follows. In a vessel with a basic lining, e.g. a basic-lined open hearth furnace or a basic lined electric arc furnace, a steel melt is produced conventionally by smelting and decarburization. If necessary, the molten metal is refined to remove sulphur by addition of lime, CaO or a basic lime rich slag and is deoxidized with aluminum or a comparable deoxidant. The process in accordance with the invention is then continued in a separate, non-basic lined reaction vessel, for example in an acid-lined converter or ladle reactor. Examples of acid-linings are fire-clay or silica bricks. Neutrally lined converters may also be considered.

The slag of the type above described is then introduced into the molten steel in the form of a finely crushed powder preferably using a non-oxidizing gas, e.g. an inert gas such as argon in the manner above described. Since the slag has a lower density and lower melting point than the molten metal, the slag will eventually rise to the surface removing the original non deformable inclusions from the molten metal. The reactions that occur in the refining according to the invention are facilitated by the fact the original basic inclusions have a poor wetting power towards the steel, whilst the slag added according to the invention has a very good wetting power towards the steel. The temperature should be maintained to keep the steel in a molten condition and above the melt a slag cover is gradually formed where the separated inclusions are collected. In order further to improve efficiency, it is also possible to cover the molten metal with a layer of slag before the refining according to the invention begins. The slag cover acts as a diluting and absorbing agent for the inclusions separated, so that return of the basic inclusions to the molten metal is prevented.

While the present invention is aimed primarily at the treatment of basic steels containing non deformable inclusions, it can also be used to treat non-basic steels to reduce the extent of the deformable inclusions without, at the same time, introducing non-deformable inclusions into the solidified product.

The following Example is given to illustrate the invention.

The refining is carried out in a tiltable induction furnace of 40 to 50 kg capacity. The body of the furnace is encircled by the induction coils and the furnace has a tuyere opening into the furnace through the center of the bottom. The tuyere itself does not penetrate through the bottom into the interior of the furnace but terminates at the internal surface of the furnace bottom. The top of the tuyere has a diameter of 2 mm and is constructed of copper apart from the final 15 mm tip which is made of aluminium and has a 1 mm diameter. The furnace is lined with silica.

30 Kg of cut bars of tool steel are melted in the furnace. The tool steel has the following composition: C, 0.89%; Si, 0.37%; Mn, 1.29%; P, 0.16%; S, 0.006%; Cr, 0.67%; Ni, 0.07%; Mo, 0.02%; W, 0.42%; V, 0.10%; Cu, 0.05%; Al, 0.02%; and the remainder Fe. This tool steel was prepared in a basic lined electric arc furnace and a visual microscopic examination of the cut bars indicates that the number of inclusions was not high for a steel produced by this method. However, the inclusions were not of the plastically deformable type and analysis indicated that they were of the $CaO/Al_2O_3$ type.

The slag used in the process is one of composition MnO, 60%; $SiO_2$, 40%; prepared by melting the oxides together and grinding the solidified melt. The resulting slag powder has a particle size less than 1.45 mm, all the powder will pass a 100 mesh sieve.

The tool steel is melted and a flow of argon introduced through the tuyere at the rate of 4 liters per minute. The temperature of the molten steel is maintained at 1600° C. After 5 minutes with all the steel melted and maintained at 1600° C, 300g of the slag powder are introduced in the argon stream over a period of 20 minutes, the temperature and argon flow rate being maintained at 1600° C and 4 l/min. respectively. The argon flow is maintained at the same rate for a further 15 minutes and the refined steel then cast into ingots. Th solidified ingots are then forged and reduced 50% in cross sectional area and the steel then examined. Visual microscopic examination (X 1000) indicates that some inclusions are present but that they are long and thin, the length of the inclusions running in the direction of elongation during the hot working of the steel, indicating clearly the plastic or deformable nature of the inclusions.

Microprobe analysis shows that the inclusions are of the $MnO/Al_2O_3/SiO_2$ or of the $MnO/Al_2O_3$ type and that, unlike the inclusions in the starting tool steel, they do not contain calcium.

Quantitative television microscope analysis indicates the following:

| Vol % of inclusions containing | | | Number of oxygen containing inclusions per - mm$^2$ | | | Number of sulphur containing inclusions per mm$^2$ | | |
| --- | --- | --- | --- | --- | --- | --- | --- | --- |
| oxygen | sulphur | total | >3µ | >5µ | >10µ | >3µ | >5µ | >10µ |
| 0.1 | 0.4 | 0.5 | 1.3 | 0.8 | 0.1 | 4.6 | 1.6 | .1 |

The inclusions present are few in number and small in size.

The procedure described above was repeated using 0.5% and 1.5% w/w slag based on the weight of the steel and a steel of similar characteristics to that described above was obtained, i.e. although the steel originally contained non deformable calcium containing inclusions, the refined steel contained a small number of small calcium free inclusions which deformed during hot working of the steel.

We claim:
1. A process for producing a steel substantially free from calcium containing inclusions which are not plastically deformable at a hot forming temperature of the steel which comprises forming a body of molten steel in a vessel having a lining in contact with the molten steel, the lining being substantially free from calcium containing compounds and from magnesium containing compounds and introducing into the body of molten steel, below the surface thereof, a slag powder, having a composition falling within the area defined by the boundaries ABCDA in the drawing, and having a melting point not higher than that of the steel and a density not higher than that of the steel, whereby the slag interacts with any inclusions in the molten steel bringing some of the inclusions to the surface of the molten steel and transforming other inclusions so that any inclusions which form in the steel on solidification are plastically deformable at hot forming temperatures.

2. A process according to claim 1, wherein the slag powder is introduced into the molten steel by entrainment in an inert carrier gas.

3. A process according to claim 1, wherein the steel is melted in an induction furnace having a refractory silica lining and at least one tuyere opening into the furnace nearer to the bottom of the body of molten steel than to the top and the slag powder, entrained in an inert carrier gas, is introduced into the body of molten steel through the tuyere.

4. A process according to claim 1, wherein the starting steel is a basic steel containing inclusions which are not plastically deformable at hot forming temperatures.

5. A process according to claim 1, wherein the average particle size of the slag powder is less than 2 mm.

6. A process according to claim 1, wherein the slag has a composition falling within the area defined by the boundaries E—F—G—H—E in the drawing.

7. A process according to claim 6, wherein the slag has a composition 60% by weight MnO, 40% by weight $SiO_2$.

8. A process according to claim 1, wherein the total weight of slag introduced is 0.1 to 2.0% based on the weight of steel.

9. A process according to claim 8, wherein 0.5 to 1.5% by weight of slag is introduced.

* * * * *